May 12, 1925. 1,537,478
G. LIPKE
NUT LOCK
Filed Dec. 14, 1923
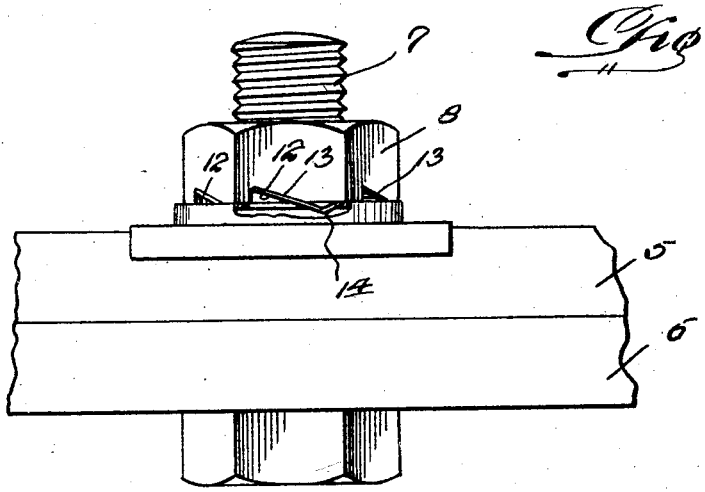
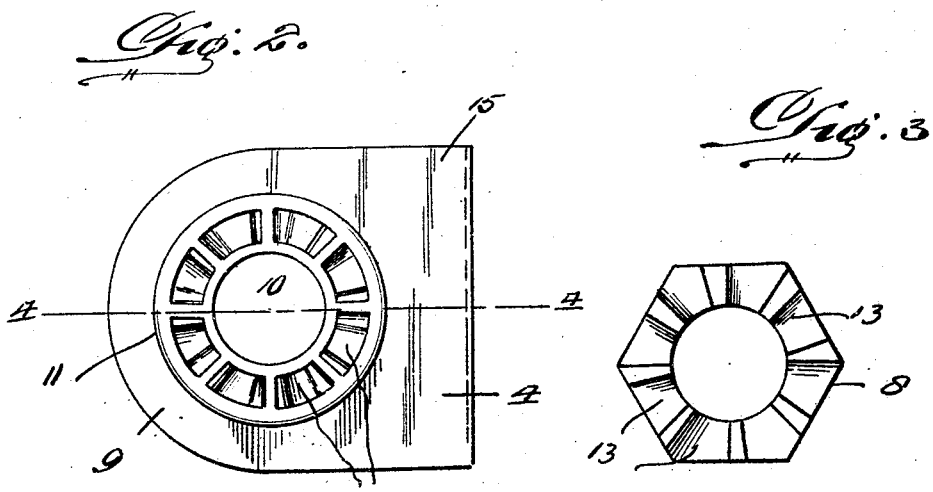
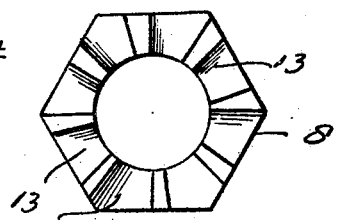
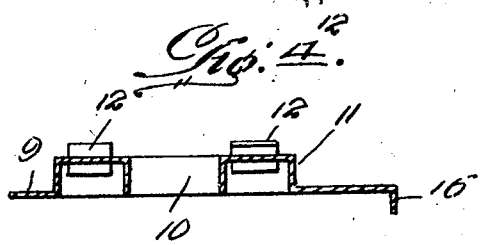
G. Lipke, Inventor Patented May 12, 1925.

1,537,478

UNITED STATES PATENT OFFICE.

GUSTAV LIPKE, OF EAST PITTSBURGH, PENNSYLVANIA.

NUT LOCK.

Application filed December 14, 1923. Serial No. 680,669.

*To all whom it may concern:*

Be it known that I, GUSTAV LIPKE, citizen of the United States, residing at East Pittsburgh, in the county of Allegheny and State of Pennsylvania, have invented certain new and useful Improvements in Nut Locks, of which the following is a specification.

This invention relates to certain new and useful improvements in nut locks, and has particular reference to nut locks of the pawl and ratchet base clutch type.

The primary object of the invention is to provide a nut lock of the above kind which embraces the desired qualities of simplicity and durability of construction and efficiency in operation.

A specific object of the invention is to provide a nut locking washer of simplified and improved form and of the type embodying yieldable or resilient pawls adapted for co-operation with ratchet notches in the base of the nuts to be locked.

A further object of the invention is to so construct the washer as to permit free yielding of the pawls so as to reduce to a minimum any resistance offered to turning of the nut onto the bolt, although effectively resisting turning of the nut off of the bolt.

A further object is to provide a nut locking washer embodying resilient pawls adapted to cooperate with ratchet notches upon the base of the nut to be locked, and so formed and constructed as to be readily stamped from sheet metal, by means of a stamping and shaping operation and in a cheap and expeditious manner.

Other objects will appear as the nature of the invention is better understood and the same consists in the novel form, combination, and arrangement of parts hereinafter more fully described, shown in the accompanying drawing and claimed.

In the drawing, wherein like reference characters indicate corresponding parts throughout the several views:

Figure 1 is an elevational view showing members bolted together with the bolt and nut equipped and constructed to form a nut lock in accordance with the present invention.

Figure 2 is a plan view of the washer.

Figure 3 is a bottom plan view of the nut, and

Figure 4 is a sectional view, taken substantially upon the line 4—4 of Figure 2.

Referring more in detail to the drawing, 5 and 6 indicate the pieces of work or members to be bolted together, and through which the stem of the bolt 7 is passed in the usual manner, a nut 8 being threaded upon the bolt stem for maintaining the members 5 and 6 in their bolted condition. The present invention aims to provide means for effectively preventing turning of the nut 8 off of the bolt 7, so that the members 5 and 6 will remain tightly bolted together, even though subjected to severe vibration or the like.

The invention embodies a special form of washer shown in Figures 1, 2, and 4, and comprising a sheet metal plate 9 provided with an opening 10 of circular form, through which the stem of the bolt 7 may be freely passed, the portion of the plate 9 surrounding the opening 10 being offset laterally to form an outwardly projecting annular channel 11, the inner flange of which forms the wall of the opening 10, as shown clearly in Figure 4. The web or intermediate portion of the channel 11 has a circular series of resilient outwardly projecting inclined pawls 12 struck therefrom so as to cooperate with a circular series of ratchet notches 13 provided in the base of the nut 8 in an obvious manner for permitting free rotation of the nut 8 in the direction in which it is turned for screwing the same onto the bolt 7 while positively preventing rotation of the nut 8 relative to the washer when the said nut is turned in a direction to thread the same off of the bolt. As shown clearly in Figure 2, the pawls 12 are of arcuate or curvilinear form in plan and form integral members of the channel portion 11 of the washer plate 9, said pawls 12 being provided adjacent their points of connection with the web of the channel member 11 with inward bends as at 14, so as to reduce to a minimum frictional resistance to the turning of the nut 8 under all conditions. By providing the channel member 11, the pawls 12 may bodily yield in a comparatively free manner inwardly of the channel member 11 for permitting the rotation of the nut in threading the same onto the bolt. Thus, the pawls will not only flex but will also be bodily displaced for permitting turning of the nut onto the bolt, and the flexing of said pawls will be minimized so that a long period of usefulness will be had by the washer and the pawls will not be liable to breakage due to the crystallizing action of excessive flexing or bending. Also, the pawls are never tightly wedged between the adjacent surfaces of the work and the nut, as is the case with washers wherein the pawls extend from the bodies of the washers and said washer bodies are of plane or flat form and without the annular channel member 11.

Any suitable means may be provided for preventing turning of the washer relative to the bolt, and, as shown, this means comprises an extension 15, on one side of the washer plate 9, the free end of which may be set or bent laterally, as at 16, to provide a lip engaging an edge of the adjacent piece of work in a manner that is generally and well known in the art.

The operation of the device is substantially the same as that of devices of this general type that have already heretofore been proposed, except for the location and action of the pawls 12 as outlined above.

From the foregoing description, it is believed that the construction and operation, as well as the advantages of the present invention will be readily understood and appreciated by those skilled in the art.

What I claim as new is:

In combination with a nut provided on its under side with ratchet notches, a lock in the form of a washer consisting of a plate having a central opening adapted to receive a bolt and provided around said opening with an annular upstruck portion which is approximately U-shaped in transverse section, the intermediate part of the said upstruck portion being provided with incisions and the material between the opposite end portions of the incisions being depressed inwardly and within the upstruck portion of the plate and then extended through the openings provided by the incisions and having free ends disposed above the exterior surface of the intermediate part of the upstruck portion, the said material thus formed providing resilient pawls permanently connected with the plate and adapted to engage in the ratchet notches of the nut.

In testimony whereof I affix my signature.

GUSTAV LIPKE.